US012234307B2

(12) United States Patent
Lee et al.

(10) Patent No.: US 12,234,307 B2
(45) Date of Patent: Feb. 25, 2025

(54) ETHYLENE/ALPHA-OLEFIN COPOLYMER AND METHOD FOR PREPARING THE SAME

(71) Applicant: LG Chem, Ltd., Seoul (KR)

(72) Inventors: Young Woo Lee, Daejeon (KR); Seul Ki Kim, Daejeon (KR); Dae Woong Lee, Daejeon (KR); Jin Kuk Lee, Daejeon (KR); Eun Jung Lee, Daejeon (KR); Jin Sam Gong, Daejeon (KR); Jung Ho Jun, Daejeon (KR); Jun Hyuk Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 722 days.

(21) Appl. No.: 17/430,909

(22) PCT Filed: Sep. 25, 2020

(86) PCT No.: PCT/KR2020/013077
§ 371 (c)(1),
(2) Date: Aug. 13, 2021

(87) PCT Pub. No.: WO2021/060917
PCT Pub. Date: Apr. 1, 2021

(65) Prior Publication Data

US 2022/0081501 A1 Mar. 17, 2022

(30) Foreign Application Priority Data

Sep. 27, 2019 (KR) ........................ 10-2019-0120125

(51) Int. Cl.
*C08F 210/16* (2006.01)
*C08J 5/18* (2006.01)
*C08L 23/06* (2006.01)
*C08L 23/08* (2006.01)
*C08L 23/0807* (2025.01)

(52) U.S. Cl.
CPC ............... *C08F 210/16* (2013.01); *C08J 5/18* (2013.01); *C08L 23/06* (2013.01); *C08J 2323/08* (2013.01); *C08L 23/08* (2013.01); *C08L 23/0815* (2013.01); *C08L 2203/206* (2013.01)

(58) Field of Classification Search
CPC .... C08F 210/16; C08F 2500/03; C08L 23/06; C08L 23/08; C08L 23/0815; C08L 2203/206
See application file for complete search history.

(56) References Cited

U.S. PATENT DOCUMENTS 4,026,809 A * 5/1977 Lachowicz .......... C10M 145/14 508/470
6,482,532 B1 11/2002 Yap et al.
6,812,289 B2 * 11/2004 Van Dun ................ B32B 27/32 526/348
7,041,617 B2 * 5/2006 Jensen ................... C08F 10/00 502/227
9,018,329 B2 * 4/2015 Yang .......................... C08J 5/18 526/352
10,370,467 B2 * 8/2019 Miura .................. C08F 210/16
10,414,086 B2 * 9/2019 McLeod ................ B29C 55/12
11,028,258 B2 * 6/2021 Tso ........................ C08L 23/16
11,186,662 B1 * 11/2021 Kufeld .................. C08F 210/16
2003/0114595 A1 6/2003 Van Dun et al.
2006/0047079 A1 3/2006 Takahashi et al.
2007/0093627 A1 4/2007 Iseki et al.
2010/0305292 A1 12/2010 Nozue et al.
2011/0172322 A1 7/2011 Michel et al.
2013/0059103 A1 3/2013 Yang et al.
2013/0167911 A1 7/2013 Ikenaga et al.
2015/0322184 A1 11/2015 Hlavinka et al.
2016/0251505 A1 9/2016 Jin et al.
2016/0325486 A1 11/2016 McLeod et al.
2017/0183431 A1 6/2017 Yoda
2019/0169323 A1 6/2019 Lee et al.
2021/0054178 A1 * 2/2021 Tso ........................ C08L 23/16
2021/0253835 A1 8/2021 Tso et al.

FOREIGN PATENT DOCUMENTS

CN 1245513 A 2/2000
CN 1939943 A 4/2007
CN 103140940 A 6/2013
JP 2001505949 A 5/2001
JP 2003535719 A 12/2003
JP 2007023154 A 2/2007
JP 2009149872 A 7/2009
JP 2010258439 A 11/2010
JP 2014-189623 A * 10/2014 ................ C08J 5/18
JP 2015211189 A 11/2015
JP 2016525587 A 8/2016
JP 2017098409 A 6/2017
JP 2017514966 A 6/2017
JP 2017120898 A 7/2017
JP 2018517586 A 7/2018

(Continued)

OTHER PUBLICATIONS

JP 2014-189623A (Oct. 6, 2014); machine translation. (Year: 2014).*
International Search Report for PCT/KR2020/013077 dated Jan. 13, 2021, 2 pgs.
Search Report dated Feb. 24, 2022 from Office Action for Chinese Application No. 202080029788.2 issued Mar. 2, 2022. 3 pgs.
Extended European Search Report for Application No. 20869254.1 dated Mar. 18, 2022. 8 pgs.

*Primary Examiner* — Rip A Lee
(74) *Attorney, Agent, or Firm* — Lerner David LLP

(57) ABSTRACT

The present invention relates to an ethylene/alpha-olefin copolymer having a high weight average molecular weight and narrow molecular weight distribution, and at the same time, a reduced characteristic relaxation time, thereby showing excellent physical properties, and a method for preparing the same.

A resin composition having improved volume resistance and excellent light transmittance may be prepared by using such ethylene/alpha-olefin copolymer. Accordingly, the ethylene/alpha-olefin copolymer may be utilized in various uses in electrical and electronic industrial fields.

14 Claims, No Drawings

(56) References Cited

FOREIGN PATENT DOCUMENTS

| | | | |
|---|---|---|---|
| JP | 2018125317 | A | 8/2018 |
| KR | 20010085372 | A | 9/2001 |
| KR | 20080108265 | A | 12/2008 |
| KR | 20130110180 | A | 10/2013 |
| KR | 101723774 | B1 | 4/2017 |
| WO | 9826000 | A1 | 6/1998 |
| WO | 2013033689 | A1 | 3/2013 |
| WO | 2014209256 | A1 | 12/2014 |
| WO | 2021034554 | A1 | 2/2021 |

* cited by examiner

ETHYLENE/ALPHA-OLEFIN COPOLYMER AND METHOD FOR PREPARING THE SAME

CROSS-REFERENCE TO RELATED APPLICATIONS

This present application is a national phase entry under 35 U.S.C. § 371 of International Application No. PCT/KR2020/013077 filed Sep. 25, 2020, which claims priority from Korean Patent Application No. 10-2019-0120125 filed Sep. 27, 2019, all of which are incorporated herein by reference.

TECHNICAL FIELD

The present invention relates to an ethylene/alpha-olefin copolymer which has a reduced characteristic relaxation time and improved volume resistance, and may be usefully utilized as an insulating material, a composition for an encapsulant film using the same, and an encapsulant film including the same.

BACKGROUND ART

As global environmental problems, energy problems, etc. get worse and worse, solar cells receive attention as an energy generating means without fear of environmental contamination and exhaustion. If solar cells are used outside such as the roof of a building, generally, a module type of the solar cells is used. In order to obtain a crystalline solar cell module when manufacturing a solar cell module, protection sheet for solar cell module (surface side protection member)/solar cell encapsulant/crystalline solar cell device/solar cell encapsulant/protection sheet for solar cell module (back side protection member) are stacked in order. In addition, when manufacturing a thin film-based solar cell module, thin film-type solar cell device/solar cell encapsulant/protection sheet for solar cell module (back side protection member) are stacked in order. As the encapsulant of the solar cell, generally, an ethylene/vinyl acetate copolymer or ethylene/alpha-olefin copolymer having excellent transparency, flexibility, adhesiveness, etc. is used.

Meanwhile, the solar cell module is generally used at the outside for a long time, and defects including performance degradation due to various external stimuli are consistently observed. Particularly, the resolution of potential induced degradation (PID) phenomenon found in high-powered power plant types is urgently needed.

In a large-capacity generating system for obtaining high voltage by connecting multiple solar cell modules, the volume resistance of an encapsulant decreases according to the increase of the temperature and humidity at an installed place, and a potential difference is generated between the cell of the solar cells and a frame. At last, toward the end of an array of multiple solar cell modules connected in series, the potential difference between the cell of the solar cells and the frame increases. In the presence of such potential difference, leakage current may be generated, and generating efficiency may be rapidly reduced, and this is called as PID phenomenon.

Based on such backgrounds, the development of an ethylene/alpha-olefin copolymer which may improve volume resistance without degrading light transmittance and may consistently prevent PID phenomenon is required.

PRIOR ART DOCUMENT

[Patent Document]

Japanese Laid-open Patent No. 2015-211189

DISCLOSURE OF THE INVENTION

Technical Problem

An object of the present invention is to provide an ethylene/alpha-olefin copolymer having a reduced characteristic relaxation time and showing high volume resistance.

In addition, an object of the present invention is to provide a composition for an encapsulant film, including the ethylene/alpha-olefin copolymer.

In addition, an object of the present invention is to provide an encapsulant film including the composition for an encapsulant film.

In addition, an object of the present invention is to provide a solar cell module including the encapsulant film.

Technical Solution

To solve the above tasks, the present invention provides an ethylene/alpha-olefin copolymer satisfying the following conditions (a) to (c):

(a) a characteristic relaxation time (A) at 190° C. in shear rate conditions of 0.1 to 500 rad/s, is less than 10.0 ms (millisecond);

(b) a weight average molecular weight is from 40,000 to 150,000 g/mol; and (c) molecular weight distribution is from 1.5 to 2.5.

In addition, the present invention provides a composition for an encapsulant film, including the ethylene/alpha-olefin copolymer.

In addition, the present invention provides an encapsulant film including the composition for an encapsulant film.

In addition, the present invention provides a solar cell module including the encapsulant film.

Advantageous Effects

The ethylene/alpha-olefin copolymer of the present invention is an ethylene/alpha-olefin copolymer having a high weight average molecular weight and narrow molecular weight distribution, and at the same time, a reduced characteristic relaxation time. The ethylene/alpha-olefin copolymer shows high volume resistance and has excellent insulating properties, and may be used in various uses in electrical and electronic industries.

BEST MODE FOR CARRYING OUT THE INVENTION

Hereinafter, the present invention will be described in more detail to assist the understanding of the present invention.

It will be understood that words or terms used in the present disclosure and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Ethylene/Alpha-Olefin Copolymer

The ethylene/alpha-olefin copolymer of the present invention is characterized in satisfying the following conditions (a) to (c):

(a) a characteristic relaxation time (A) at 190° C. in shear rate conditions of 0.1 to 500 rad/s, is less than 10.0 ms (millisecond);

(b) a weight average molecular weight is from 40,000 to 150,000 g/mol; and (c) molecular weight distribution is from 1.5 to 2.5.

The ethylene/alpha-olefin copolymer of the present invention is prepared through a post processing of continuously performing a step of dissolving a polymerization product of ethylene and an alpha-olefin monomer in an organic solvent and a step of mixing with an alcohol to form a precipitate, as described later.

In the dissolving step and the precipitate-forming step, an ethylene/alpha-olefin copolymer is dissolved in an organic solvent which is capable of achieving complete dissolution, and then is slowly added to an alcohol dropwisely to obtain a precipitate from which a branch-type structure part with a low molecular weight is removed. Through the post processing, the ethylene/alpha-olefin copolymer of the present invention may have a characteristic relaxation time reduced to less than a specific value, and at the same time, a high molecular weight and narrow molecular weight distribution.

The ethylene/alpha-olefin copolymer of the present invention is characterized in having a characteristic relaxation time ($\lambda$) at 190° C. in shear rate conditions of 0.1 to 500 rad/s, of less than 10.0 ms (millisecond). The characteristic relaxation time may be less than 10.0 ms, particularly, less than 9.5 ms, less than 9.3 ms, and 1.0 ms or more.

The characteristic relaxation time means a time for restoring an equilibrium state of the stress in a polymer after applying a constant deformation to a polymer. The characteristic relaxation time is related to the entanglement structure of the polymer. If the polymer has a long-chain branch, the chain entanglement may increase, and this becomes a factor of increasing the characteristic relaxation time. That is, the reduction of the characteristic relaxation time of the polymer means the reduction of the entanglement degree of a chain, and is interpreted as the removal of a portion of a branch-type structure in the polymer or the deformation into a linear structure, so as to reduce a branch-type structure.

While polymerizing ethylene and an alpha-olefin monomer, both a low molecular weight region and a high molecular weight region are formed in a copolymer, and the low molecular weight region among them is produced by 8-hydride elimination and early termination through the insertion of a large amount of the alpha-olefin monomer into a main chain. Accordingly, the low molecular weight region may have a low molecular weight and a structure with a high degree of branching.

The branch-type structure increases the free volume of a polymer, inhibits the formation of a crystal and induces the reduction of volume resistance. In order to increase the volume resistance, it is important to remove a region having a low molecular weight and a high degree of branching in a copolymer.

In the present invention, by dissolving the polymer product of ethylene and an alpha-olefin monomer and then precipitating in an alcohol which is a poor solvent, a high molecular weight region in a copolymer is precipitated in the alcohol, a low molecular weight region is dissolved in the alcohol, and the separation is achieved. That is, the ethylene/alpha-olefin copolymer of the present invention obtains the high molecular weight portion precipitated in the alcohol as a final product. This contains a small amount of a branch-type structure as described above, serves a polymer with a small free volume and showing excellent volume resistance with a structure in which the movement of electrons or ions is limited.

The ethylene/alpha-olefin copolymer of the present invention is characterized in having (b) a weight average molecular weight of 40,000 to 150,000 g/mol, and (c) molecular weight distribution of 1.5 to 2.5.

In addition, the weight average molecular weight may be 40,000 to 150,000 g/mol, particularly, 40,000 g/mol or more, 41,000 g/mol or more, 42,000 g/mol or more, 43,000 g/mol or more, 44,000 g/mol or more, and 150,000 g/mol or less, 130,000 g/mol or less, 100,000 g/mol or less.

In addition, the molecular weight distribution (MWD) may be 1.5 to 2.5, particularly, 1.50 or more, 1.80 or more, and 2.50 or less, 2.40 or less, 2.30 or less, 2.25 or less.

The weight average molecular weight (Mw) and the number average molecular weight (Mn) are polystyrene conversion molecular weights analyzed by gel permeation chromatography (GPC), and the molecular weight distribution may be calculated from the ratio of Mw/Mn.

Generally, if two or more types of monomers are polymerized, for example, if ethylene and an alpha-olefin monomer are polymerized to prepare a copolymer, according to the internal temperature gradient of a reactor, termination rate may be changed, and side reactions including beta-hydride elimination may be generated. Accordingly, a branch-type structure is formed in a polymer, a low molecular weight chain is produced, and the widening of molecular weight distribution is difficult to control, and the characteristic relaxation time of a polymer increases. Therefore, there are problems of reducing the impact strength and mechanical properties of a copolymer and inducing blocking phenomenon.

On the contrary, the copolymer of the present invention has a high molecular weight and shows narrow molecular weight distribution and a reduced characteristic relaxation time at the same time, by removing a low molecular weight portion of a branch-type structure through processes of dissolving in an organic solvent and precipitating in an alcohol as described above.

Meanwhile, the copolymer of the present invention is characterized in having a short characteristic relaxation time and at the same time, a high weight average molecular weight and narrow molecular weight distribution, and through this, excellent volume resistance may be achieved.

For example, though molecular weight distribution is narrow, if a majority of a branch-type structure is included in a copolymer, the characteristic relaxation time of the copolymer may increase, and such structural characteristics represent a large free volume in the copolymer and become a factor degrading volume resistance. In addition, even though linearity is high, and a characteristic relaxation time is short, if a copolymer shows wide molecular weight distribution, a low molecular weight region may be included a lot, and due to high charge in a low molecular weight region, volume resistance may decrease.

In the present invention, the ethylene/alpha-olefin copolymer may have a density measured according to ASTM D-792 of 0.850 to 0.910 g/cc. Particularly, the density may be 0.850 g/cc or more, 0.855 g/cc or more, 0.860 g/cc or more, or 0.865 g/cc or more, and 0.910 g/cc or less, 0.900 g/cc or less, 0.890 g/cc or less.

In the present invention, the ethylene/alpha-olefin copolymer may have a melt index ($MI_{2.16}$, 190° C., 2.16 kg load conditions) of 0.1 to 50 g/10 min. Particularly, the melt index may be 0.1 g/10 min or more, 1 g/10 min or more, 1.5 g/10 min or more, 2.0 g/10 min or more, and 50 g/10 min or less, 40.0 g/10 min or less, 35.0 g/10 min or less, 30.0 g/10 min or less.

In the ethylene/alpha-olefin copolymer, the alpha-olefin is derived from an alpha-olefin monomer which is a comonomer, and may be an alpha-olefin monomer of 4 to 20 carbon atoms. Particular examples may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, etc., and any one among them or mixtures of two or more thereof may be used.

Among them, the alpha-olefin monomer may be 1-butene, 1-hexene or 1-octene, most preferably, 1-butene.

In addition, in the ethylene/alpha-olefin copolymer, the alpha-olefin content may be suitably selected in the range satisfying the physical conditions, particularly, greater than 0 mol %, 99 mol % or less, or 10 to 50 mol %, without limitation.

Method for Preparing Ethylene/Alpha-Olefin Copolymer

The method for preparing an ethylene/alpha-olefin copolymer of the present invention is characterized in including (S1) a step of preparing a polymerization product of ethylene and an alpha-olefin monomer; (S2) a step of dissolving the polymerization product in an organic solvent; and (S3) a step of mixing with an alcohol of 2 to 5 carbon atoms to form a precipitate.

Step (S1)

Step (S1) is a step for preparing a polymerization product of ethylene and an alpha-olefin monomer.

The polymerization product may be used including the meaning of both a composition in a state of an ethylene/alpha-olefin copolymer after performing the polymerization reaction of ethylene and an alpha-olefin monomer without separation or purification, or a solid phase obtained by separating only an ethylene/alpha-olefin copolymer after polymerization.

If the polymerization product is the composition of an ethylene/alpha-olefin copolymer after performing the polymerization reaction of ethylene and an alpha-olefin monomer without separation or purification, unreacted ethylene, unreacted alpha-olefin monomer, a catalyst used for polymerization, etc., may be included in addition to the ethylene/alpha-olefin copolymer prepared by the polymerization reaction. In addition, if the polymerization of the ethylene and alpha-olefin monomer is solution polymerization, the polymerization product may include all the above-described materials and may include a hydrocarbon solvent used for polymerization. In this case, the ethylene/alpha-olefin copolymer may be partially or entirely swelled in the polymerization product, and the remainder may be present in a dispersed state in a hydrocarbon solvent.

In addition, if the polymerization product is the solid phase obtained by separating only an ethylene/alpha-olefin copolymer after polymerization, in order to prepare the polymerization product, a method of preparing by directly polymerizing ethylene and an alpha-olefin monomer and removing a solvent, unreacted reactants, etc., or a method of purchasing a commercially available solid phase ethylene/alpha-olefin copolymer may be used.

The method used for polymerizing the ethylene and alpha-olefin monomer is not limited. For example, the polymerization reaction may be performed using a catalyst composition including a known transition metal compound and a co-catalyst through common reaction conditions and methods.

For example, in the presence of an organic solvent, slurry polymerization by which a monomer of gas or liquid is supplied and polymerization is performed, bulk polymerization by which polymerization is performed in the presence of a liquid monomer, gas-phase polymerization by which polymerization is performed in the presence of a gas-phase monomer, etc. may be used, a polymerization method of continuous or batch type is not limited, and polymerization conditions such as polymerization temperature or pressure may be suitably controlled by a skilled person.

Step (S2)

Step (S2) is a step of dissolving the polymerization product in an organic solvent and is a step for dissolving an ethylene/alpha-olefin copolymer present in a swelled state or a solid phase in the polymerization product. In order to maximize the removing effects of a low molecular weight fraction through alcohol precipitation in step (S3), the ethylene/alpha-olefin copolymer in a swelled or solid state, not dissolved in a solution is required to undergo first a step of being dissolved to release a chain.

In respect of preferably accomplish the object, the organic solvent may preferably be a compound of 7 to 16 carbon atoms. If the carbon number of the organic solvent is 6 or less, the solubility with respect to the ethylene/alpha-olefin copolymer may be insufficient, and the boiling point of the organic solvent is lower than the ethylene/alpha olefin copolymer, and thus, it is apprehended that defects of drying the organic solvent may arise according to the temperature performing step (S2). In addition, if the carbon number of the organic solvent is 17 or more, the organic solvent may be present in a solid state at room temperature, and defects of difficult dissolution of the ethylene/alpha-olefin copolymer may arise.

The organic solvent may be one or more selected from the group consisting of heptane, octane, isooctane, toluene, xylene and cumene, and may preferably be heptane, without limitation.

Step (S3)

Step (S3) is a step of mixing with an alcohol of 2 to 5 carbon atoms to form a precipitate, and is for removing a low molecular weight fraction in the dissolved ethylene/alpha-olefin copolymer and obtaining a high molecular weight fraction as a precipitate.

From the high molecular weight fraction precipitated in the alcohol, portions including a large amount of low molecular weight and branch-type chain in the ethylene/alpha-olefin copolymer were removed when compared with the polymerization product prior to performing steps (S2) and (S3). Accordingly, the copolymer thus obtained includes a less free volume and has improved volume resistance.

The alcohol of 2 to 5 carbon atoms may be one or more selected from the group consisting of ethanol, propan-1-ol, propan-2-ol, butan-1-ol, buta-2-ol, 2-methylpropan-2-ol, pentan-1-ol, pentan-2-ol, pentan-3-ol, 2-methylbutan-2-ol and 3-methylbutan-2-ol, without limitation. Preferably, the alcohol of 2 to 5 carbon atoms may be propan-2-ol or butan-2-ol, more preferably, propan-2-ol (isopropyl alcohol).

The methanol of 1 carbon atom is a non-solvent and has insignificant effects of removing a low molecular weight portion, and an alcohol of 6 or more carbon atoms has excessively good solubility with the copolymer, and dissolves even a high molecular weight portion. Accordingly, defects of reducing the yield for obtaining only a high molecular weight portion of the ethylene/alpha-olefin copolymer through precipitation may be generated.

In the present invention, step (S2) and step (S3) may be alternately repeatedly performed by twice to five times. Preferably, step (S2) and step (S3) may be alternately repeatedly performed by four times or five times. Here, the alternate repeated performance by twice means performing step (S2), step (S3), step (S2) and step (S3) in order, and the alternate repeated performance by four times means performing step (S2), step (S3), step (S2), step (S3), step (S2), step (S3), step (S2) and step (S3) in order.

If the number of alternate repeating of step (S2) and step (S3) increases, a low molecular weight fraction not removed may be dissolved and removed, but if the washing number is six times or more, significant change of the molecular weight distribution or volume resistance is not shown. Considering washing effects and economic feasibility, the washing number may preferably be four times or five times. step (S2) and step (S3) may be alternately repeatedly performed by twice to five times.

Composition for Encapsulant Film and Encapsulant Film

The ethylene/alpha-olefin copolymer of the present invention may be prepared into a resin composition by including an additional material, and the resin composition may be utilized as various molded articles by molding by an injection or extrusion method. Particularly, the copolymer may be used as an encapsulant for encapsulating a device in various optoelectronic devices, for example, may be used as an industrial material which may be applied in a lamination process with heating, but the use thereof is not limited thereto.

Particularly, the ethylene/alpha-olefin copolymer of the present invention may be processed as a composition for an encapsulant film, for example, a silane modified resin composition or an amino silane modified resin composition may be prepared.

Particularly, the composition for an encapsulant film may include a known crosslinking agent, crosslinking auxiliary agent, silane coupling agent, etc., in addition to the ethylene/alpha-olefin copolymer.

The crosslinking agent is a radical initiator in the preparation step of the silane modified resin composition, and may play the role of initiating graft reaction of an unsaturated silane composition onto a resin composition. In addition, by forming a crosslinking bond in the silane modified resin composition, or between the silane modified resin composition and an unmodified resin composition during a lamination step for manufacturing an optoelectronic device, the heat resistant durability of a final product, for example, an encapsulant sheet may be improved.

The crosslinking agent may use various crosslinking agents well-known in this technical field only if it is a crosslinking compound capable of initiating the radical polymerization of a vinyl group or forming a crosslinking bond, for example, one or two or more selected from the group consisting of organic peroxides, hydroxyl peroxides and azo compounds.

Particularly, one or more selected from the group consisting of dialkyl peroxides such as t-butylcumylperoxide, di-t-butyl peroxide, di-cumyl peroxide, 2,5-dimethyl-2,5-di (t-butylperoxy)hexane, and 2,5-dimethyl-2,5-di(t-butylperoxy)-3-hexyne; hydroperoxides such as cumene hydroperoxide, diisopropyl benzene hydroperoxide, 2,5-dimethyl-2,5-di(hydroperoxy)hexane, and t-butyl hydroperoxide; diacyl peroxides such as bis-3,5,5-trimethylhexanoyl peroxide, octanoyl peroxide, benzoyl peroxide, o-methylbenzoyl peroxide, and 2,4-dichlorobenzoyl peroxide; peroxy esters such as t-butylperoxy isobutyrate, t-butylperoxy acetate, t-butylperoxy-2-ethylhexylcarbonate (TBEC), t-butylperoxy-2-ethylhexanoate, t-butylperoxy pyvalate, t-butylperoxy octoate, t-butylperoxyisopropyl carbonate, t-butylperoxybenzoate, di-t-butylperoxyphthalate, 2,5-dimethyl-2,5-di(benzoylperoxy)hexane, and 2,5-dimethyl-2,5-di(benzoylperoxy)-3-hexyne; ketone peroxides such as methyl ethyl ketone peroxide, cyclohexanone peroxide, and lauryl peroxide, and azo compounds such as azobisisobutyronitrile and azobis(2,4-dimethylvaleronitrile), may be used, without limitation.

The organic peroxide may be an organic peroxide having a one-hour half-life temperature of 120 to 135° C., for example, 120 to 130° C., 120 to 125° C., preferably, 121° C. The "one-hour half-life temperature" means a temperature at which the half-life of the crosslinking agent becomes one hour. According to the one-hour half-life temperature, the temperature at which radical initiation reaction is efficiently performed may become different. Therefore, in case of using the organic peroxide having the one-hour half-life temperature in the above-described range, radical initiation reaction, that is, crosslinking reaction in a lamination process temperature for manufacturing an optoelectronic device may be effectively performed.

The crosslinking agent may be included in an amount of 0.01 to 1 parts by weight, for example, 0.05 to 0.55 parts by weight, 0.1 to 0.5 parts by weight or 0.15 to 0.45 parts by weight based on 100 parts by weight of the composition for an encapsulant film. If the crosslinking agent is included in less than 0.01 parts by weight, heat resistance properties may be insignificant, and if the amount is greater than 1 part by weight, the moldability of an encapsulant film is deteriorated, problems generating process limitation may arise, and physical properties of an encapsulant may be influenced.

In addition, the composition for an encapsulant film may include a crosslinking auxiliary agent in addition to the crosslinking agent. By including the crosslinking auxiliary agent, the crosslinking degree in the composition for an encapsulant film by the crosslinking agent may be increased, and accordingly, the heat resistant durability of a final product, for example, an encapsulant sheet may be improved even further.

The crosslinking auxiliary agent may use various crosslinking auxiliary agents well-known in this technical field, for example, a compound containing at least one or more unsaturated groups such as an allyl group and a (meth) acryloxy group may be used.

The compound containing the allyl group may include, for example, a polyallyl compound such as triallyl isocyanurate (TAIC), triallyl cyanurate, diallyl phthalate, diallyl fumarate and diallyl maleate, and the compound containing the (meth)acryloxy group may include a poly(meth)acryloxy compound such as ethylene glycol diacrylate, ethylene glycol dimethacrylate, and trimethylolpropane trimethacryate, without limitation.

The crosslinking auxiliary agent may be included in an amount of 0.01 to 0.5 parts by weight, for example, 0.01 to 0.3 parts by weight, 0.015 to 0.2 parts by weight, or 0.016 to 0.16 parts by weight based on 100 parts by weight of the composition for an encapsulant film. If the crosslinking auxiliary agent is included in less than 0.01 parts by weight, the improving effects of heat resistance properties may be insignificant, and if the amount is greater than 0.5 parts by weight, problems of affecting the physical properties of a final product, for example, an encapsulant film may be generated, and the production cost may increase.

In addition, the composition for an encapsulant film may additionally include a silane coupling agent in addition to the ethylene/alpha-olefin copolymer, the crosslinking agent and the crosslinking auxiliary agent.

The silane coupling agent may use, for example, one or more selected from the group consisting of N-(β-aminoethyl)-γ-aminopropyltrimethoxysilane, N-(β-aminoethyl)-γ-aminopropylmethyldimethoxysilane, γ-aminopropyltriethoxysilane, γ-glycidoxypropyltrimethoxysilane, and γ-methacryloxypropyltrimethoxysilane (MEMO).

The silane coupling agent may be included in 0.1 to 1 parts by weight based on 100 parts by weight of the composition for an encapsulant film. If the amount used is less than 0.1 parts by weight, adhesiveness with glass during manufacturing a solar cell module may become poor, and water penetration may become easy, and thus, the long-term performance of the module may not be secured. If the amount is more than 1 part by weight, it acts as an increasing factor of Y.I, undesirably.

In addition, the composition of an encapsulant film may additionally include an unsaturated silane compound and an amino silane compound.

The unsaturated silane compound may be grafted into a main chain including the polymerization unit of the monomer of the ethylene/alpha-olefin copolymer of the present invention in the presence of a radical initiator, etc., and included in a polymerized type in a silane modified resin composition or an amino silane modified resin composition.

The unsaturated silane compound may be vinyltrimethoxy silane, vinyltriethoxy silane, vinyltripropoxy silane, vinyltriisopropoxy silane, vinyltributoxy silane, vinyltripentoxy silane, vinyltriphenoxy silane, or vinyltriacetoxy silane, and in an embodiment, vinyltrimethoxy silane or vinyltriethoxy silane may be used among them, without limitation.

In addition, the amino silane compound may act as a catalyst for promoting hydrolysis reaction for converting an unsaturated silane compound grafted in the main chain of the copolymer, for example, a reactive functional group such as the alkoxy group of vinyltriethoxy silane into a hydroxyl group in the grafting modification step of the ethylene/alpha-olefin copolymer, to improve the adhesive strength of upper and lower glass substrates or with a back sheet composed of a fluorine resin, etc. In addition, the amino silane compound may be directly involved as a reactant in copolymerization reaction and may provide an amino modified resin composition with a moiety having an amine functional group.

The amino silane compound is a silane compound including an amine group and is not specifically limited as long as it is a primary amine or a secondary amine. For example, the amino silane compound may use aminotrialkoxysilane, aminodialkoxysilane, etc., and examples may include one or more selected from the group consisting of 3-aminopropyltrimethoxysilane (APTMS), 3-aminopropyltriethoxysilane (APTES), bis[(3-triethoxysilyl)propyl]amine, bis[(3-trimethoxysilyl)propyl]amine, 3-aminopropylmethyldiethoxysilane, 3-aminopropylmethyldimethoxysilane, N-[3-(trimethoxysilyl)propyl]ethylenediamine (DAS), aminoethylaminopropyltriethoxysilane, aminoethylaminopropylmethyldimethoxysilane, aminoethylaminopropylmethyldiethoxysilane, aminoethylaminomethyltriethoxysilane, aminoethylaminomethylmethyldiethoxysilane, diethylenetriaminopropyltrimethoxysilane, diethylenetriaminopropyltriethoxysilane, diethylenetriaminopropylmethyldimethoxysilane, diethyleneaminomethylmethyldiethoxysilane, (N-phenylamino)methyltrimethoxysilane, (N-phenylamino)methyltriethoxysilane, (N-phenylamino) methylmethyldimethoxysilane, (N-phenylamino)methylmethyldiethoxysilane, 3-(N-phenylamino)propyltrimethoxysilane, 3-(N-phenylamino)propyltriethoxysilane, 3-(N-phenylamino) propylmethyldimethoxysilane, 3-(N-phenylamino)propylmethyldiethoxysilane, and N—(N-butyl)-3-aminopropyltrimethoxysilane. The amino silane compound may be used alone or as a mixture type.

The amounts of the unsaturated silane compound and/or the amino silane compound are not specifically limited.

In addition, the composition for an encapsulant film may additionally include one or more additives selected from a light stabilizer, a UV absorbent and a thermal stabilizer as necessary.

The light stabilizer may capture the active species of the photothermal initiation of a resin to prevent photooxidation according to the use applied of the composition. The type of the light stabilizer used is not specifically limited, and for example, known compounds such as a hindered amine-based compound and a hindered piperidine-based compound may be used.

The UV absorbent absorbs ultraviolet rays from the sunlight, etc. and transform into harmless thermal energy in a molecule, and may play the role of preventing the excitation of the active species of photothermal initiation in the resin composition. Particular types of the UV absorbent used are not specifically limited, and for example, one or a mixture of two or more of benzophenone-based, benzotriazole-based, acrylnitrile-based, metal complex-based, hindered amine-based, inorganic including ultrafine particulate titanium oxide and ultrafine particulate zinc oxide UV absorbents, etc. may be used.

In addition, the thermal stabilizer may include a phosphor-based thermal stabilizer such as tris(2,4-di-tert-butylphenyl)phosphite, phosphorous acid, bis[2,4-bis(1,1-dimethylethyl)-6-methylphenyl]ethylester, tetrakis(2,4-di-tert-butylphenyl)[1,1-biphenyl]-4,4'-diylbisphosphonate and bis(2,4-di-tert-butylphenyl)pentaerythritol diphosphite; and a lactone-based thermal stabilizer such as the reaction product of 8-hydroxy-5,7-di-tert-butyl-furan-2-on and o-xylene, and one or two or more of them may be used.

The amounts of the light stabilizer, UV absorbent and/or thermal stabilizer are not specifically limited. That is, the amounts of the additives may be suitably selected considering the use of the resin composition, the shape or density of the additives, etc. Generally, the amounts may be suitably controlled in a range of 0.01 to 5 parts by weight based on 100 parts by weight of the total solid content of the composition for an encapsulant film.

In addition, the composition for an encapsulant film of the present invention may additionally include various additives well-known in this art according to the use of the resin component applied in addition to the above components.

In addition, the present invention provides an encapsulant film including the composition for an encapsulant film.

The encapsulant film of the present invention may be prepared by molding the composition for an encapsulant film into a film or sheet shape. The molding method is not specifically limited, for example, a sheet or a film may be formed by a common process such as a T die process and extrusion. For example, the manufacture of the encapsulant film may be performed in situ using an apparatus in which the preparation of a modified resin composition using the composition for an encapsulant film and a process for forming a film or a sheet are connected.

The thickness of the encapsulant film may be controlled to about 10 to 2,000 μm, or about 100 to 1,250 μm considering the supporting efficiency and breaking possibility of a device in an optoelectronic device, the reduction of the weight or workability of the device, and may be changed according to the particular use thereof.

Solar Cell Module

In addition, the present invention provides a solar cell module including the encapsulant film. In the present invention, the solar cell module may have a configuration in which the gaps between the solar cells disposed in series or in parallel are filled with the encapsulant film of the present invention, a glass surface is disposed on a side where the sunlight strikes, and a backside is protected by a back sheet, but is not limited thereto. Various types and shapes of the solar cell modules manufactured by including the encapsulant film in this technical field may be applied in the present invention.

The glass surface may use tempered glass for protecting the solar cells from external impact and preventing breaking, and may use low iron tempered glass having low iron content to prevent the reflection of the sunlight and to increase the transmittance of the sunlight, without limitation.

The back sheet is a climate-resistant film protecting the backside of the solar cell module from exterior, for example, a fluorine-based resin sheet, a metal plate or metal film such as aluminum, a cyclic olefin-based resin sheet, a polycarbonate-based resin sheet, a poly(meth)acryl-based resin sheet, a polyamide-based resin sheet, a polyester-based resin sheet, a laminated composite sheet of a climate-resistant film and a barrier film, etc., without limitation.

Besides, the solar cell module of the present invention may be manufactured by any methods well-known in this technical field only if including the encapsulant film, without limitation.

The solar cell module of the present invention is manufactured using an encapsulant film having excellent volume resistance, and the leakage of current outside through the movement of electrons in the solar cell module may be prevented through the encapsulant film. Accordingly, potential induced degradation phenomenon (PID) by which insulation is degraded, leakage current is generated, and the output of the module is rapidly degraded, may be largely restrained.

EXAMPLES

Hereinafter, the present invention will be explained in more detail referring to embodiments. However, the embodiments are provided only for illustration, and the scope of the present invention is not limited thereto.

Preparation of Catalyst (1) Preparation of Ligand Compound

Synthesis of N-tert-butyl-1-(1,2-dimethyl-3H-benzo[b]cyclopenta[d]thiophen-3-yl)-1,1-dimethylsilanamine To a 100 ml schlenk flask, 4.65 g (15.88 mmol) of chloro(1,2-dimethyl-6,7-dihydro-3H-benzo[b]cyclopenta[d]thiophene-3-yl)dimethylsilane was weighed and added, and 80 ml of THF was injected thereto. At room temperature, $tBuNH_2$ (4 eq, 6.68 ml) was injected thereto and reacted at room temperature for 3 days. After finishing the reaction, THF was removed, and the resultant reaction product was filtered with hexane. After drying solvents, 4.50 g (86%) of a yellow liquid was obtained.

$^1H$ NMR (in $CDCl_3$, 500 MHz): δ 7.99 (d, 1H), δ 7.83 (d, 1H), δ 7.35 (dd, 1H), δ 7.24 (dd, 1H), δ 3.49 (s, 1H), δ 2.37 (s, 3H), δ 2.17 (s, 3H), δ 1.27 (s, 9H), δ 0.19 (s, 3H), δ −0.17 (s, 3H).

(2) Preparation of Transition Metal Compound

[Formula 1]

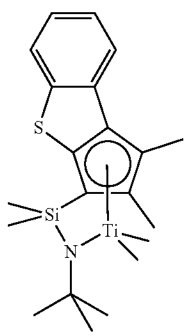

To a 50 ml schlenk flask, the ligand compound (1.06 g, 3.22 mmol/1.0 eq) and 16.0 ml (0.2 M) of MTBE were put and stirred first. n-BuLi (2.64 ml, 6.60 mmol/2.05 eq, 2.5 M in THF) was added thereto at −40° C. and reacted at room temperature overnight. After that, MeMgBr (2.68 ml, 8.05 mmol/2.5 eq, 3.0 M in diethyl ether) was slowly added thereto dropwisely at −40° C., and $TiCl_4$ (2.68 ml, 3.22 mmol/1.0 eq, 1.0 M in toluene) was put in order, followed by reacting at room temperature overnight. After that, the reaction mixture was passed through celite using hexane for filtration. After dying the solvents, 1.07 g (82%) of a brown solid was obtained.

$^1H$-NMR (in $CDCl_3$, 500 MHz): δ 7.99 (d, 1H), δ 7.68 (d, 1H), δ 7.40 (dd, 1H), δ 7.30 (dd, 1H), δ 3.22 (s, 1H), δ 2.67 (s, 3H), δ 2.05 (s, 3H), δ 1.54 (s, 9H), δ 0.58 (s, 3H), δ 0.57 (s, 3H), δ 0.40 (s, 3H), δ −0.45 (s, 3H).

Preparation Example 1

While injecting a hexane solvent in 5.00 kg/h and 1-butene in 1.30 kg/h, a 1.5 L continuous process reactor was pre-heated at 120° C. A triisobutylaluminum (Tibal, 60 μmol/min), the transition metal compound of [Formula 1] (0.35 μmol/min) and a dimethylanilinium tetrakis(pentafluorophenyl)borate co-catalyst (1.05 μmol/min) were injected into the reactor at the same time. Then, into the reactor, ethylene (0.87 kg/h) and a hydrogen gas (20 cc/min) were injected and copolymerization reaction was continuously carried out while maintaining a pressure of 89 bar and 150° C. for 60 minutes or more to prepare a copolymer. After drying for 12 hours or more in a vacuum oven, an ethylene/alpha-olefin copolymer was prepared.

Preparation Examples 2 to 8

Ethylene/alpha-olefin copolymers were prepared by the same method as in Preparation Example 1 except for changing polymerization conditions as shown in Table 1 below.

TABLE 1

| | C2 | Alpha-olefin | | Cat. | Co-cat. | Tibal | Solvent | Polymerization temp. |
|---|---|---|---|---|---|---|---|---|
| | kg/h | Type | kg/h | μmol/min | | μmol/min | kg/h | ° C. |
| Preparation Example 1 | 0.87 | 1-C4 | 1.30 | 0.35 | 1.05 | 60 | 5.00 | 150 |
| Preparation Example 2 | 0.87 | 1-C4 | 0.90 | 0.15 | 0.45 | 20 | 5.00 | 140 |
| Preparation Example 3 | 0.87 | 1-C4 | 0.90 | 0.25 | 0.75 | 30 | 7.00 | 150 |
| Preparation Example 4 | 0.87 | 1-C4 | 1.00 | 0.20 | 0.60 | 30 | 5.00 | 145 |
| Preparation Example 5 | 0.87 | 1-C4 | 1.50 | 0.44 | 1.32 | 30 | 4.65 | 160 |
| Preparation Example 6 | 0.87 | 1-C8 | 0.48 | 0.48 | 0.43 | 30 | 5.00 | 160 |
| Preparation Example 7 | 0.87 | 1-C8 | 0.50 | 0.55 | 1.65 | 30 | 5.00 | 160 |
| Preparation Example 8 | 0.87 | 1-C8 | 1.30 | 0.70 | 2.10 | 60 | 4.00 | 160 |

Example 1

Step (S2)

20 g of the ethylene/alpha-olefin copolymer of Preparation Example 1 and 400 ml of heptane were mixed to prepare a composition and stirred at 80° C. until a copolymer was completed dissolved and became transparent with the naked eye.

Step (S3)

After reducing the temperature to room temperature, the transparent composition was added dropwisely to 1.4 L of isopropyl alcohol while stirring. After finishing the dropwise addition, a liquid phase portion was removed, and a precipitate solid phase was separated and dried in vacuum at 110° C. for 48 hours.

Step (S2) and step (S3) were alternately repeatedly performed four times to prepare an ethylene/alpha-olefin copolymer.

Examples 2 to 8, and Comparative Examples 1 to 8

Ethylene/alpha-olefin copolymers were prepared by the same method as in Example 1 except for changing the type of the ethylene/alpha-olefin copolymer and the number of performing step (S2) and step (S3) as in Table 2 below.

TABLE 2

| | Ethylene/alpha-olefin copolymer | Number of step (S2) | Number of step (S3) |
|---|---|---|---|
| Example 1 | Preparation Example 1 | 4 | 4 |
| Example 2 | Preparation Example 2 | 4 | 4 |
| Example 3 | Preparation Example 3 | 4 | 4 |
| Example 4-1 | Preparation Example 4 | 3 | 3 |
| Example 4-2 | Preparation Example 4 | 4 | 4 |
| Example 5-1 | Preparation Example 5 | 1 | 1 |
| Example 5-2 | Preparation Example 5 | 2 | 2 |
| Example 5-3 | Preparation Example 5 | 3 | 3 |
| Example 5-4 | Preparation Example 5 | 4 | 4 |
| Example 6 | Preparation Example 6 | 4 | 4 |
| Example 7 | Preparation Example 7 | 4 | 4 |
| Example 8 | Preparation Example 8 | 4 | 4 |
| Comparative Example 1 | Preparation Example 1 | 0 | 0 |
| Comparative Example 2 | Preparation Example 2 | 0 | 0 |
| Comparative Example 3-1 | Preparation Example 3 | 0 | 0 |
| Comparative Example 3-2 | Preparation Example 3 | 0 | 1 |
| Comparative Example 4 | Preparation Example 4 | 0 | 0 |
| Comparative Example 5 | Preparation Example 5 | 0 | 0 |
| Comparative Example 6 | Preparation Example 6 | 0 | 0 |
| Comparative Example 7-1 | Preparation Example 7 | 0 | 0 |

TABLE 2-continued

| | Ethylene/alpha-olefin copolymer | Number of step (S2) | Number of step (S3) |
|---|---|---|---|
| Comparative Example 7-2 | Preparation Example 7 | 1 | 0 |
| Comparative Example 8 | Preparation Example 8 | 0 | 0 |

Experimental Example 1

With respect to the ethylene/alpha-olefin copolymers prepared in the Examples and Comparative Examples, physical properties were evaluated according to the methods below and are shown in Table 3.

(1) Characteristic Relaxation Time

A complex viscosity according to the angular speed of the copolymer was obtained at 190° C. in an angular speed range of 0.1-500 rad/s at 5% strain using ARES-G2 Rheometer of TA Co., and a characteristic relaxation time was calculated by fitting using a Carreau-Yasuda equation below.

$$\eta(\gamma)=\eta_\infty+(\eta_0-\eta_\infty)[1+(\lambda\gamma)^\alpha]^{(n-1)/\alpha}$$

$\eta(\gamma)$: Viscosity $\eta^\infty$: Infinite viscosity $\eta0$: Zero-shear viscosity $\lambda$: Relaxation time $\gamma$: Shear-rate $\alpha$: Material constants n: Shear thinning index (2) Weight Average Molecular Weight (Mw) and Molecular Weight Distribution (MWD)

A weight average molecular weight (Mw) and a number average molecular weight (Mn) were measured using gel permeation chromatography (GPC), and the molecular weight distribution was calculated through dividing the weight average molecular weight (Mw) by a number average molecular weight (Mn).

Column: PL Olexis

Solvent: Trichlorobenzene (TCB)

Flow rate: 1.0 mL/min

Specimen concentration: 1.0 mg/mL

Injection amount: 200 μL column temperature: 160° C.

Detector: Agilent High Temperature RI detector

Standard: Polystyrene (calibrated by cubic function)

(3) Density (g/cm$^3$)

Measurement was conducted according to ASTM D-792.

(4) Melt Index ($MI_{2.16}$, g/10 Min)

Measurement was conducted according to ASTM D-1238 (condition E, 190° C., 2.16 kg load).

TABLE 3

| | Characteristic relaxation time | Mw (g/mol) | MWD | Density (g/cm$^3$) | Melt index (g/10 min) |
|---|---|---|---|---|---|
| Example 1 | 4.9 | 73,000 | 2.08 | 0.864 | 4.7 |
| Example 2 | 4.8 | 72,000 | 2.03 | 0.873 | 5.0 |
| Example 3 | 4.3 | 58,000 | 2.02 | 0.875 | 14.3 |
| Example 4-1 | 4.1 | 49,000 | 2.16 | 0.880 | 18.5 |
| Example 4-2 | 3.5 | 50,000 | 2.00 | 0.880 | 17.1 |
| Example 5-1 | 8.0 | 44,000 | 2.25 | 0.871 | 30.0 |
| Example 5-2 | 5.3 | 44,000 | 2.19 | 0.871 | 29.5 |
| Example 5-3 | 4.2 | 46,000 | 2.10 | 0.871 | 27.2 |
| Example 5-4 | 3.0 | 46,000 | 2.05 | 0.871 | 25.4 |
| Example 6 | 9.2 | 83,000 | 1.92 | 0.901 | 2.4 |
| Example 7 | 4.4 | 70,000 | 2.02 | 0.902 | 6.0 |
| Example 8 | 3.2 | 45,000 | 2.15 | 0.872 | 27.8 |
| Comparative Example 1 | 53.1 | 69,000 | 2.31 | 0.864 | 5.0 |
| Comparative Example 2 | 87.1 | 69,000 | 2.30 | 0.873 | 5.5 |
| Comparative Example 3-1 | 25.2 | 56,000 | 2.27 | 0.875 | 15.6 |
| Comparative Example 3-2 | 24.3 | 56,000 | 2.25 | 0.875 | 15.2 |
| Comparative Example 4 | 16.9 | 48,000 | 2.36 | 0.880 | 20.2 |
| Comparative Example 5 | 12.1 | 43,000 | 2.37 | 0.871 | 33.8 |
| Comparative Example 6 | 190.2 | 79,000 | 2.20 | 0.901 | 2.8 |
| Comparative Example 7-1 | 70.0 | 67,000 | 2.29 | 0.902 | 6.4 |
| Comparative Example 7-2 | 67.2 | 67,000 | 2.27 | 0.902 | 6.2 |
| Comparative Example 8 | 4.8 | 41,000 | 2.54 | 0.872 | 36.5 |

As summarized in the table above, it was confirmed that the Examples prepared the ethylene/alpha-olefin copolymers by performing the steps of dissolving in an organic solvent and precipitating in an alcohol according to the present invention, satisfied all the characteristic relaxation time, Mw, and MWD in the numerical ranges specified in the present invention.

Particularly, when comparing Examples 4-1 and 4-2, and Examples 5-1 to 5-4, with the increase of repeating number of the dissolving in an organic solvent and the precipitating in an alcohol, an ethylene/alpha-olefin copolymer having an even higher molecular weight and narrower MWD was prepared, and the characteristic relaxation time was gradually reduced.

Meanwhile, the Comparative Examples are cases of not performing the steps of dissolving in an organic solvent and the precipitation in an alcohol after polymerizing ethylene and an alpha-olefin monomer. It was confirmed that Comparative Examples 1 to 7-2, etc. showed markedly increased characteristic relaxation time in contrast to the Examples, and Comparative Example 8 showed wide MWD and deviated from the conditions defined in the present invention.

Particularly, it was confirmed that in Comparative Example 3-2 in which dissolving in an organic solvent was not performed and precipitation in an alcohol was directly performed, as well as in the Comparative Examples not using both the organic solvent and the alcohol, a copolymer chain was insufficiently released, precipitation in an alcohol was insufficiently performed, and a low molecular weight portion was not removed. Accordingly, the characteristic relaxation time was still long. In addition, in Comparative Example 7-2 in which dissolving in an organic solvent was performed but precipitation in an alcohol was not performed, long characteristic relaxation time was shown, because the removal of a branch-type low molecular weight portion was not achieved.

Experimental Example 2

6 g of the ethylene/alpha-olefin copolymer was put in a 0.5 T square frame, and the front side and the rear side were covered with 3T steel plates. This was injected into a high temperature press. After continuously treating at 190° C., 25 N/cm$^2$ (240 seconds), six times of decompressing/pressurizing degassing, and at 190° C., 151 N/cm$^2$ for 240 seconds, the temperature was reduced by 15° C. per minute to 30° C., and in this case, the pressure was maintained to 151 N/cm$^2$. By maintaining 30° C. and 151 N/cm$^2$ for 300 seconds, the manufacture of a specimen was completed.

Then, with respect to the specimen thus manufactured, volume resistance and total transmittance were measured by the methods below and shown.

(1) Volume Resistance (Ω·Cm)

Measurement was conducted by applying a voltage of 1000 V for 600 seconds using Agilent 4339B High-resistance meter (product of Agilent Technologies K.K.) under temperature conditions of 23±1° C. and humidity conditions of 50±3%.

(2) Light Transmittance (%)

Light transmittance at 550 nm was measured using Shimadzu UV-3600 spectrophotometer.

Measurement mode: transmittance

Wavelength interval: 1 nm

Measurement rate: medium

TABLE 4

| | Volume resistance (Ω · cm) | Light transmittance (%) |
|---|---|---|
| Example 1 | $2.60 \times 10^{16}$ | 91.1 |
| Comparative Example 1 | $3.10 \times 10^{14}$ | 91.0 |

TABLE 5

| | Volume resistance (Ω · cm) | Light transmittance (%) |
|---|---|---|
| Example 2 | $5.20 \times 10^{16}$ | 90.6 |
| Comparative Example 2 | $2.50 \times 10^{14}$ | 90.5 |

TABLE 6

| | Volume resistance (Ω · cm) | Light transmittance (%) |
|---|---|---|
| Example 3 | $7.50 \times 10^{16}$ | 90.5 |
| Comparative Example 3-1 | $1.00 \times 10^{14}$ | 90.4 |
| Comparative Example 3-2 | $2.10 \times 10^{14}$ | 90.4 |

TABLE 7

| | Volume resistance (Ω · cm) | Light transmittance (%) |
|---|---|---|
| Example 4-1 | $3.40 \times 10^{16}$ | 89.3 |
| Example 4-2 | $4.50 \times 10^{16}$ | 89.5 |
| Comparative Example 4 | $1.40 \times 10^{14}$ | 89.2 |

TABLE 8

| | Volume resistance (Ω · cm) | Light transmittance (%) |
|---|---|---|
| Example 5-1 | $8.90 \times 10^{15}$ | 90.2 |
| Example 5-2 | $2.20 \times 10^{16}$ | 90.2 |
| Example 5-3 | $3.00 \times 10^{16}$ | 90.3 |
| Example 5-4 | $4.10 \times 10^{16}$ | 90.5 |
| Comparative Example 5 | $3.20 \times 10^{14}$ | 90.2 |

TABLE 9

| | Volume resistance (Ω · cm) | Light transmittance (%) |
|---|---|---|
| Example 6 | $9.80 \times 10^{16}$ | 89.0 |
| Comparative Example 6 | $4.20 \times 10^{14}$ | 88.8 |

TABLE 10

| | Volume resistance (Ω · cm) | Light transmittance (%) |
|---|---|---|
| Example 7 | $1.60 \times 10^{16}$ | 88.6 |
| Comparative Example 7-1 | $4.60 \times 10^{14}$ | 88.5 |
| Comparative Example 7-2 | $4.42 \times 10^{14}$ | 88.5 |

TABLE 11

| | Volume resistance (Ω · cm) | Light transmittance (%) |
|---|---|---|
| Example 8 | $1.50 \times 10^{16}$ | 90.4 |
| Comparative Example 8 | $7.80 \times 10^{14}$ | 90.2 |

The tables above are summaries of corresponding Examples and Comparative Examples, using the same Preparation Example. As shown above, it was confirmed that all the ethylene/alpha-olefin copolymers prepared according to the present invention could accomplish excellent volume resistance and light transmittance. On the contrary, as in the Comparative Examples, if the conditions were deviated from the scope of the present invention, including deviated characteristic relaxation time or wide MWD, the volume resistance was deteriorated.

Like this, an ethylene/alpha-olefin copolymer satisfying all of the characteristic relaxation time, Mw and MWD defined in the present invention, may achieve excellent levels of volume resistance and light transmittance without using a separate additive.

The invention claimed is:

1. An ethylene/alpha-olefin copolymer satisfying the following conditions (a) to (c):

(a) a characteristic relaxation time at 190° C. in shear rate conditions of 0.1 to 500 rad/s, is less than 10.0 millisecond;

(b) a weight average molecular weight is from 40,000 to 150,000 g/mol; and (c) a molecular weight distribution is from 1.5 to 2.5, wherein the ethylene/alpha-olefin copolymer has a density from 0.850 to 0.910 g/cc.

2. The ethylene/alpha-olefin copolymer according to claim 1, wherein the characteristic relaxation time is from 1.0 to 9.5 millisecond.

3. The ethylene/alpha-olefin copolymer according to claim 1, wherein the weight average molecular weight is from 41,000 to 130,000 g/mol.

4. The ethylene/alpha-olefin copolymer according to claim 1, wherein the molecular weight distribution is from 1.5 to 2.4.

5. The ethylene/alpha-olefin copolymer according to claim 1, which has a melt index (190° C., 2.16 kg load conditions) from 0.1 to 50 g/10 min.

6. The ethylene/alpha-olefin copolymer according to claim 1, wherein the alpha-olefin comprises one or more of propylene, 1-butene, 1-pentene, 4-methyl-1-pentene, 1-hexene, 1-heptene, 1-octene, 1-decene, 1-undecene, 1-dodecene, 1-tetradecene, 1-hexadecene or 1-eicosene.

7. A method for preparing the ethylene/alpha-olefin copolymer of claim 1, the method comprising:

(S1) a step of preparing a polymerization product of ethylene and an alpha-olefin monomer;

(S2) a step of dissolving the polymerization product in an organic solvent; and (S3) a step of mixing with an alcohol of 2 to 5 carbon atoms to form the ethylene/alpha-olefin copolymer as a precipitate.

8. The method of claim 7, wherein the organic solvent is a compound having 7 to 16 carbon atoms.

9. The method of claim 7, wherein the organic solvent is one or more selected from the group consisting of heptane, octane, isooctane, toluene, xylene and cumene.

10. The method of claim 7, wherein the alcohol having 2 to 5 carbon atoms is one or more selected from the group consisting of ethanol, propan-1-ol, propan-2-ol, butan-1-ol, butan-2-ol, 2-methylpropan-2-ol, pentan-1-ol, pentan-2-ol, pentan-3-ol, 2-methylbutan-2-ol and 3-methylbutan-2-ol.

11. The method of claim 7, wherein the step (S2) and the step (S3) are alternately repeatedly performed by twice to five times.

12. An encapsulant film comprising an ethylene/alpha-olefin copolymer satisfying the following conditions (a) to (c):

(a) a characteristic relaxation time at 190° C. in shear rate conditions of 0.1 to 500 rad/s, is less than 10.0 millisecond;

(b) a weight average molecular weight is from 40,000 to 150,000 g/mol; and (c) a molecular weight distribution is from 1.5 to 2.5, wherein the ethylene/alpha-olefin copolymer has a density from 0.850 to 0.910 g/cc.

13. The encapsulant film according to claim 12, further comprising one or more of a crosslinking agent, a crosslinking auxiliary agent, a silane coupling agent, an unsaturated silane compound, an amino silane compound, a light stabilizer, a UV absorbent or a thermal stabilizer.

14. A solar cell module comprising the encapsulant film of claim 12.

* * * * *